US008296403B2

(12) United States Patent  
Jose et al.

(10) Patent No.: US 8,296,403 B2
(45) Date of Patent: Oct. 23, 2012

(54) NETWORK ADDRESS ALLOCATION USING A USER IDENTITY

(75) Inventors: Prasanth Jose, Kerala (IN); Kalyanasundaram Subramanivan, Karnataka (IN); Karthik Ramamoorthy, Uttar Pradesh (IN)

(73) Assignee: Novell, Inc., Provo, UT (US)

( * ) Notice: Subject to any disclaimer, the term of this patent is extended or adjusted under 35 U.S.C. 154(b) by 4 days.

(21) Appl. No.: 12/604,714

(22) Filed: Oct. 23, 2009

(65) Prior Publication Data

US 2011/0099252 A1   Apr. 28, 2011

(51) Int. Cl.
G06F 15/16 (2006.01)
G06F 15/173 (2006.01)
G06F 15/177 (2006.01)

(52) U.S. Cl. ........ 709/220; 709/232; 709/222; 370/389; 370/401; 370/331; 370/349; 370/328

(58) Field of Classification Search .......... 709/217–228, 709/232; 370/328, 331, 349, 389, 401
See application file for complete search history.

(56) References Cited

U.S. PATENT DOCUMENTS

| 6,684,243 | B1 | 1/2004 | Euget et al. | |
|---|---|---|---|---|
| 6,845,094 | B1* | 1/2005 | Zhang | 370/349 |
| 7,194,004 | B1* | 3/2007 | Thomsen | 370/401 |
| 7,457,626 | B2 | 11/2008 | Bahl | |
| 7,673,010 | B2* | 3/2010 | Bennett | 709/213 |
| 2002/0009078 | A1* | 1/2002 | Wilson et al. | 370/389 |
| 2005/0091349 | A1* | 4/2005 | Scheibli | 709/222 |
| 2006/0064588 | A1* | 3/2006 | Tidwell et al. | 713/169 |
| 2008/0101291 | A1* | 5/2008 | Jiang et al. | 370/331 |
| 2008/0130623 | A1* | 6/2008 | Skog et al. | 370/349 |
| 2009/0135816 | A1* | 5/2009 | Nandagopal et al. | 370/389 |
| 2009/0154394 | A1* | 6/2009 | Park et al. | 370/328 |
| 2009/0285126 | A1* | 11/2009 | Lu et al. | 370/255 |
| 2010/0118831 | A1* | 5/2010 | Chen et al. | 370/331 |
| 2010/0293289 | A1* | 11/2010 | Hsu et al. | 709/232 |

FOREIGN PATENT DOCUMENTS

EP     2007098     12/2008

OTHER PUBLICATIONS

"IP address", *From Wikipedia, the free encyclopedia*, (Downloaded Sep. 16, 2008).

* cited by examiner

*Primary Examiner* — Haresh N Patel
(74) *Attorney, Agent, or Firm* — Schwegman, Lundberg & Woessner, P.A.

(57) ABSTRACT

Apparatus, systems, and methods assign a permanent network address to a user identity, detect access to a network by a node associated with the user identity, generate an identifier associated with the user identity, and send the identifier to the node to enable the node to obtain replacement of a temporary network address allocated to the node, with the permanent network address. Activities may include receiving a release request from a node to release a temporary network address allocated to the node (associated with the user identity), receiving an allocation request (including the identifier) from the node to allocate a permanent network address previously assigned to the user identity, and allocating the permanent network address to the node as a replacement for the temporary network address. Additional apparatus, systems, and methods are disclosed.

21 Claims, 4 Drawing Sheets

NETWORK ADDRESS ALLOCATION USING A USER IDENTITY

BACKGROUND

Currently, Internet Protocol (IP) addresses are assigned randomly, or based on a host computer address. Thus, with some organizations having hundreds or thousands of computers using the Dynamic Host Configuration Protocol (DHCP) for dynamic IP allocation, network administrators may find it onerous to track and control the network address usage of various users. It may also be difficult to assign special privileges to clients in the network based on their role in the organization, for example, since many firewalls operate using IP address-based rules.

SUMMARY

In various embodiments, apparatus, systems, and methods that support network address allocation are provided. For example, in some embodiments, network addresses are allocated by assigning a permanent network address to a user identity, detecting access to a network by a node associated with the user identity, generating an identifier associated with the user identity, and sending the identifier to the node to enable the node to replace a temporary network address allocated to the node with the permanent network address.

In some embodiments, network addresses are allocated by receiving a release request from a node to release a temporary network address allocated to the node, the node being associated with a user identity; receiving an allocation request from the node to allocate a permanent network address previously assigned to the user identity, wherein the request includes an identifier generated in association with the node and the user identity; and allocating the permanent network address to the node as a replacement for the temporary network address. Additional embodiments are described, and along with the foregoing examples, will be set forth in detail below.

DETAILED DESCRIPTION

Figure 1:
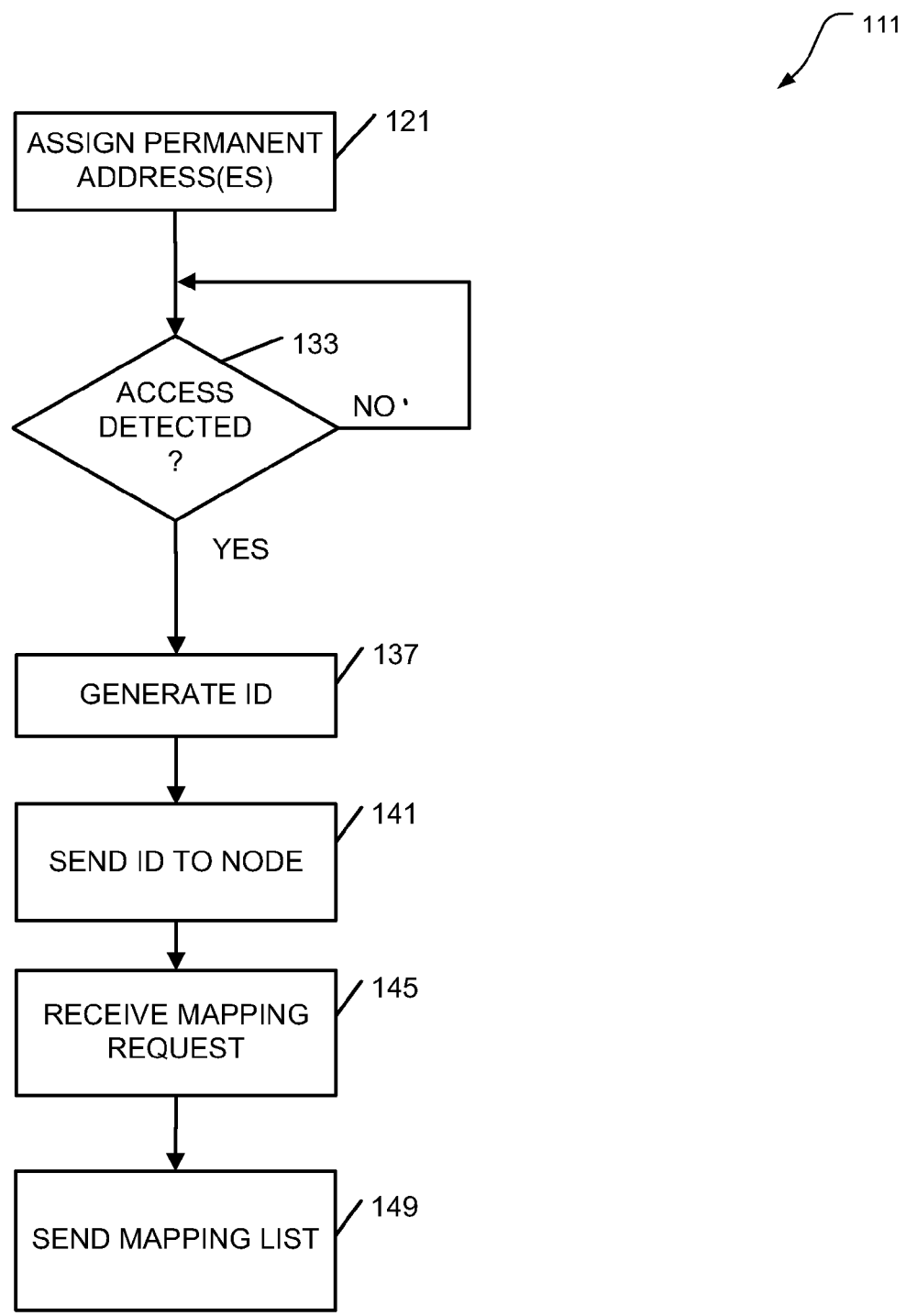
FIG. 1 is a flow diagram illustrating methods of network address allocation according to various embodiments of the invention.

To address some of the challenges described above, in various embodiments, when user accounts are created by a directory service (DS), a unique set of IP addresses is also assigned to them. Thereafter, when a user logs in to a client computer, the DS reassigns any one of the given IP addresses to the client computer that matches it's network sub-network. This is done with the help of a DHCP server. For example, assume that a user has been assigned three permanent IP addresses as shown in Table I below when the user account is created in the DS. In this case, the user has been given two IP addresses for the 192.168.0.0 sub-network and one IP address for the 192.168.1.0 sub-network.

TABLE I

| IP Address | NETWORK SUBNET |
| --- | --- |
| 192.168.0.50 | 192.168.0.0 |
| 192.168.0.51 | 192.168.0.0 |
| 192.168.1.50 | 192.168.1.0 |

When the user acts to log-in to a client computer in the 192.168.0.0 sub-network, it turns out that the client computer has already been assigned a temporary IP address by a DHCP server in the network. This temporary IP address can be used to log-in to the client computer (e.g., via DS logging). When the log-in action is authorized by the DS, a process which runs along with the authentication service (e.g., the Novell® NMAS (Novell Modular Authentication Service) directory service) can operate to create a user identifier that is associated by the DS with a list of IP addresses, such as the list shown in Table I, so that the list can later be fetched by a DHCP server.

Therefore, when the client computer runs the startup task (e.g., Novell® Client™ workstation software application), the task can operate to send a message, such as a DHCPRelease message, to release the assigned temporary IP address. The task may then operate to send a DHSPRequest message, along with the client identifier (obtained from the DS), to obtain one of the permanent IP addresses shown in Table I.

The DHCP server can process the client identifier to fetch the permanent IP address from the DS that matches the network address of the client computer. After the DHCP server fetches the list from the DS, if a matching IP address is found for the client, the DHCP server can send a DHCPACK message to the client machine. When the user of the client computer logs out, the permanent IP address is released, and the DHCP server again assigns a temporary IP address to the client computer.

In some embodiments, the DHCP server is configured to use the Lightweight Directory Access Protocol (LDAP), where client configuration information is stored in the DS. In this case, the DHCP server can read configuration information dynamically from any DS operating according to an x.500 standard.

Thus, in some embodiments, the permanent IP addresses allocated to a user identity (e.g., similar to or identical to the addresses shown in Table I) can be stored in the DS and associated with the identity of a particular user. For example, the addresses assigned via Table I can be included in configuration information that is made available in a directory on the DS for "user1", as follows:

```
host1    { //The name is independent of the configuration ...
         dhcp-client-identifier "user1";
         fixed-address 192.168.0.0, 192.168.1.0;
         }
```

When the DS authentication process operates to verify the identity of the user, a user identifier can be assigned, perhaps as a random number comprising a series of hexadecimal digits. For example, the random number can be added to the dhcp-client-identifier variable above, to provide the identifier "user1XyaZ...". This modified value is then made available to the user as a unique identifier that is associated with the authenticated user identity (e.g., via log-in activity).

The resulting random identifier that is delivered to the client computer is useful to prevent other entities from stealing permanently assigned IP addresses by making a false claim to the user identity without authentication. Thus, each request for a permanent IP address should be accompanied by a different, random identifier—so that a DHCP request that includes only a username will be rejected. Only requests to replace a temporary IP address that have the correct username and the random number generated by the DS will be accepted by the DHCP server. In this way, the DHCP server has some assurance that the correct person is requesting the permanently assigned IP address. Thus, in this example, the client computer can operate to send a DHCPRequest message with the generated string "user1XyaZ . . ." as the client identifier to the DHCP server.

The DHCP server in turn can then operate to dynamically query the DS for the dhcp-client-identifier variable matching this string, so that any one or more of the permanent IP addresses can be delivered to the DHCP server, perhaps in the form of a list of addresses, with the lease information stored in a lease database.

In summary, the process may occur as follows. The client computer is authenticated to the DS, using log-in information supplied by a user, and the DS in turn generates and assigns a unique identifier to the DHCP configuration for that user identity, and sends the resulting identifier information to the client computer. DHCP server to release the temporary IP address that was used for log-in activity. The client computer can then send a DHCPRequest message to the DHCP server to request a permanent IP address, in conjunction with the identifier it has received from the DS.

The DHCP server then can operate to query the DS, using the identifier it has obtained from the client computer, to determine one or more permanent IP addresses that have been previously assigned to the user identity that is now associated with the client computer. In response, the DS can return an IP address mapping list to the DHCP server.

The DHCP server can then select one of the permanent IP addresses returned by the DS, and allocate this address to the client computer. The DHCP server can store the lease information for the allocated address, so that no other DHCP server generates a conflict by allocating the same IP address to another entity at the same time.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

FIG. 1 is a flow diagram illustrating methods 111 of network address allocation according to various embodiments of the invention. In some embodiments, as viewed from the perspective of the DS, one or more permanent addresses are assigned to a user identity, and when that user identity attempts to access the network using a temporary address, a unique user identifier is generated. This identifier is sent to the accessing node so that one of the permanent addresses can be requested as a replacement for the temporary address.

For the purposes of this document, a "permanent" IP address is one that has been pre-assigned to a particular user identity (e.g., defined by a set of log-in credentials), and which is used to replace a temporary IP address in various embodiments of the invention. Thus, a permanent IP address is one that is intended to be associated with a particular user, regardless of the node used to log-in to a network. The permanent IP address can not be allocated unless the identity of the user is known to the DS.

A "temporary" IP address is one that is assigned to a node, rather than a user identity, and normally enables any user that operates the node to log-in to a network if valid log-in credentials are supplied. The temporary IP address is not assigned to any particular user identity, and can be assigned to a node with no knowledge of the associated user identity.

The methods 111 are implemented in a machine-accessible and readable medium and are operational over processes within and among networks. The networks may be wired, wireless, or a combination of wired and wireless. The methods 111 may be implemented as instructions, which when accessed by a specific machine, perform the processing depicted in FIG. 1. Given this context, network address allocation is now discussed with reference to FIG. 1.

In some embodiments, a processor-implemented method 111 that can be executed on one or more processors that perform the method may operate to allocate network addresses by assigning one or more permanent network addresses to a user identity at block 121. The method 111 may go on to block 133 with detecting access to a network by a node associated with the user identity. The method 111 may operate in a loop at block 133, waiting until a valid network access attempt by a client computer associated with the user identity is detected.

A DS can detect valid attempts to access the network associated with the user identity by authenticating the user identity, perhaps via log-in credentials, such as a username/password, or a fingerprint, among other mechanisms. Thus, the activity at block 133 may comprise authenticating the user identity, and authenticating may in turn comprise determining that log-in credentials received from a particular node are associated with a known user identity.

Once an access attempt associated with a particular user identify has been detected, the method 111 may continue on to block 137 with generating an identifier associated with the user identity. The identifier is one that may be randomly generated by the DS. Thus, the activity at block 137 may comprise generating the identifier as a random identifier.

The method 111 may continue on to block 141 with sending the identifier to the node, to enable the node to obtain replacement of a temporary network address (allocated to the node) with the permanent network address.

Once the address management server (e.g., a DHCP server) gets the address replacement request from the node, the server can send a query to the DS to obtain the corresponding address mapping list. Thus, the method 111 may continue on to block 145 with receiving an address mapping request from an address management server, the request including the identifier.

Once the DHCP server sends the query with the identifier to the DS, the DS can respond with a list of addresses that have been permanently assigned to the user identity. Thus, the method 111 may continue on to block 149 with sending an address mapping list including one or more permanent network addresses to an address management server in response to receiving a request from the address management server, the request including the identifier.

As noted previously, a DS can be used as a repository for the lists of permanent addresses that have been assigned to various user identities. Thus, the activity at block 149 may comprise sending the address mapping list from a DS. Other embodiments may be realized.

Figure 2:
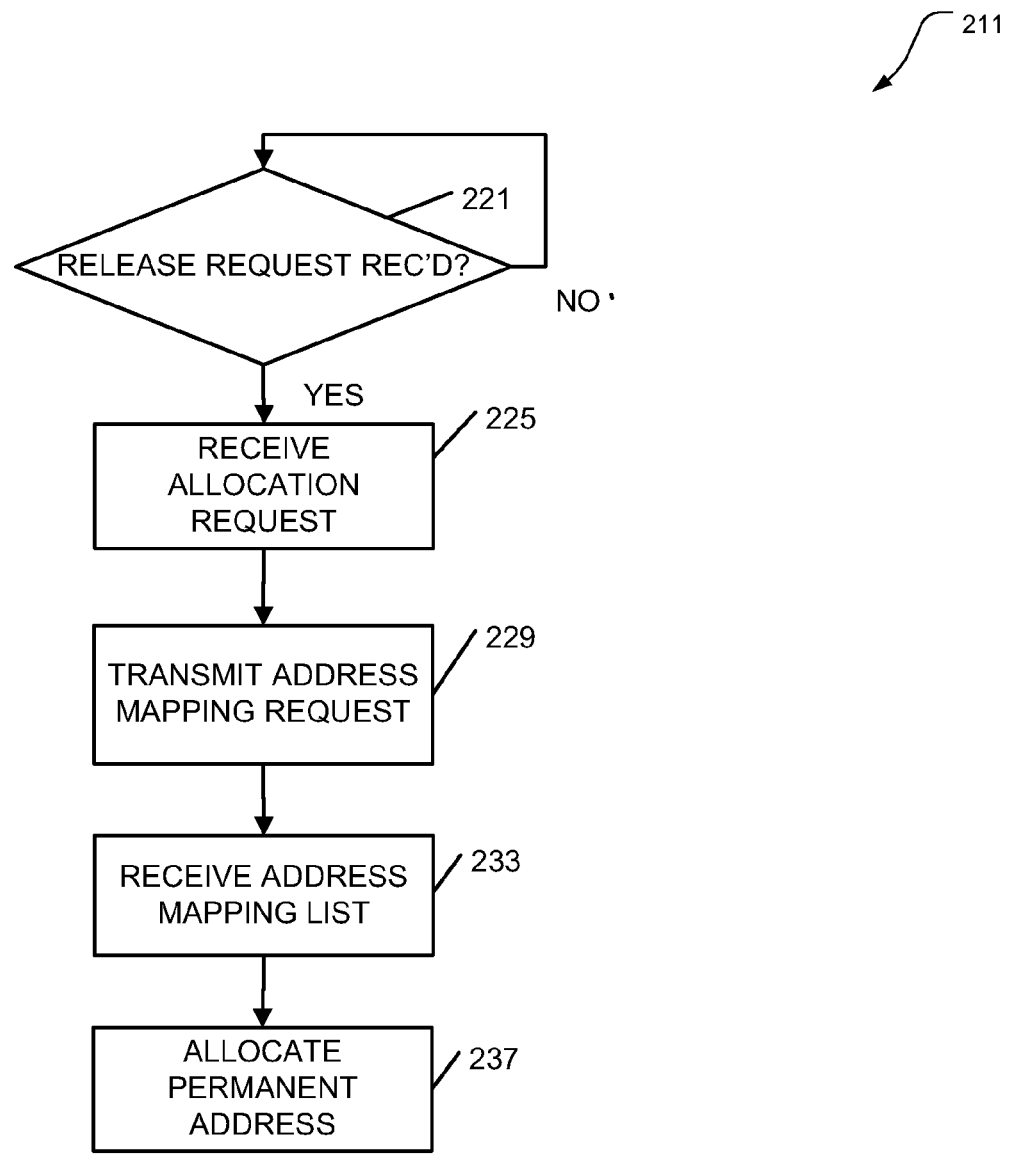
FIG. 2 is a flow diagram illustrating additional methods of network address allocation according to various embodiments of the invention.

For example, FIG. 2 is a flow diagram illustrating additional methods 211 of network address allocation according to various embodiments of the invention. In this case, the methods 211 operate from the perspective of the address management server (e.g., a DHCP server), where a temporary address release request is received from a node, and then an allocation request for a previously-assigned permanent network address is received from the same node, identified by an identifier unique to the node and the user identity. The permanent address is then allocated to the node, based on the user identity and the identifier.

The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Thus, in some embodiments, a processor-implemented method 211 that can be executed on one or more processors that perform the method may begin with waiting at block 221 to receive a release request from a node to release a temporary network address allocated to the node, wherein the node is associated with a user identity.

Once the request is received, the method 211 may continue on to block 225 with receiving an allocation request from the node to allocate a permanent network address previously assigned to the user identity, wherein the request includes an identifier generated in association with the node and the user identity. The node may send its allocation request to a DHCP server. Thus, the activity at block 225 may comprise receiving the allocation request at a DHCP server.

The identifier is one that may be randomly generated by a DS. Thus, the activity at block 225 may comprise receiving the allocation request including the identifier comprising a randomly-generated identifier generated by a DS.

Nodes may take the form of physical or virtual machines. Thus, the activity at block 225 may comprise receiving the allocation request from a virtual machine, a physical machine, or a combination of these.

The DHCP server can request previously-determined, permanent address assignment information from a DS, based on the identifier that has been temporarily associated with the node and the user identity. Thus, the method 211 may continue on to block 229 with transmitting an address mapping request to a DS, the request including the identifier.

The DS can operate to send the DHCP server one or more addresses, perhaps in the form of a list, that have been permanently assigned to the user identity, based on the identifier. Thus, the method 211 may continue on to block 233 to include receiving an address mapping list including one or more permanent network addresses, from a DS. The address mapping list may comprise multiple permanently-assigned network addresses associated with the user identity.

The method 211 may continue on to block 237 with allocating one of the permanent network addresses to the node as a replacement for the temporary network address. The permanent addresses may be assigned or allocated to a specific user identity by a network administrator via the DS.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of network address allocation shown in FIGS. 1 and 2 can be implemented in various devices, as well as in a computer-readable storage medium, where the methods are adapted to be executed by one or more processors. Further details of such embodiments will now be described.

Figure 3:
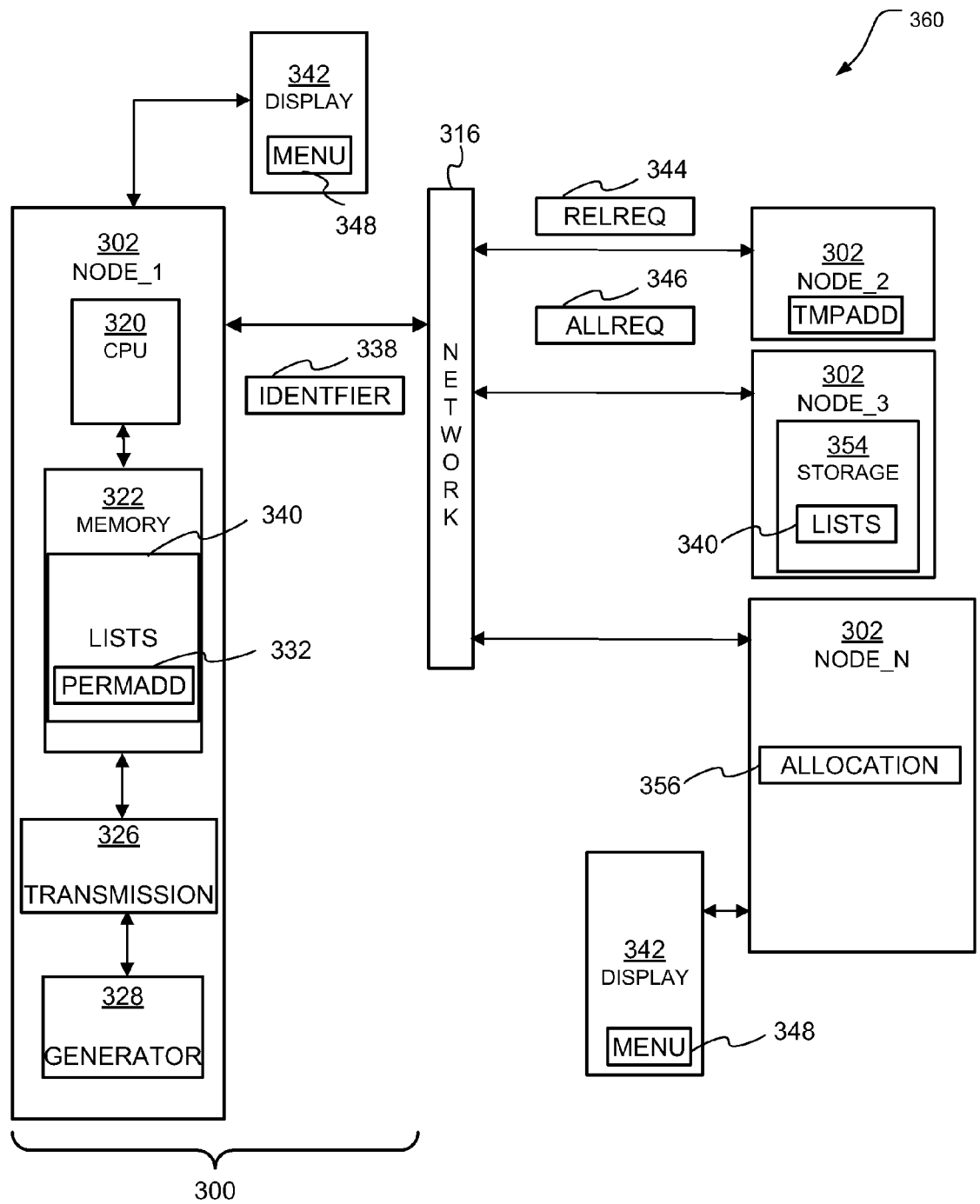
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement network address allocation may comprise one or more processing nodes 302, one or more processors 320, memory 322, a transmission module 326, a generator processor 328, and a display 342. The display 342 may be used to display a menu of permanent addresses 332 that are currently allocated to a particular user identity. The apparatus 300 may comprise a server, a client, or some other networked processing node.

The processing nodes 302 may comprise physical machines or virtual machines, or a mixture of both. The nodes 302 may also comprise networked entities, such servers and/or clients. In some implementations, the operations described can occur entirely within a single node 302.

In some embodiments, a system 360 that operates to implement network address allocation may comprise multiple instances of an apparatus 300. The system 360 might also comprise a cluster of nodes 302, including physical and virtual nodes. It should be noted that any one of the nodes 302 may include any one or more of the elements explicitly shown in nodes NODE_1, . . . , NODE_N.

In some embodiments then, a system 360 can operate using multiple nodes: one node (e.g., NODE_1) operating as a DS, another operating as a client (e.g., NODE_2), and still another (e.g., NODE_N) as a DHCP server. The storage of permanently allocated addresses 332, perhaps in the forms of lists 340, may occur in yet another node (e.g., NODE_3), completely apart from the DS, client, and DHCP nodes NODE_1, NODE_2, and NODE_N, in some embodiments.

Thus, in some embodiments, a system 360 comprises a first node (e.g., NODE_1) that provides unique identifiers 338 that enable a second node (e.g., NODE_2) to replace temporary addresses TMPADD with permanent ones PERMADD that are associated with a particular user identity.

A system 360 may also comprise a first node (e.g., NODE_1) to access a storage unit 354 or memory 322 to store a plurality of mapping lists 340, at least one of the plurality including one or more permanent network addresses 332 assigned to a user identity. The system 360 may further comprise a generator module 328 to generate an identifier 338 associated with the user identity when access to a network 316 by a second node (e.g., NODE_2) associated with the user identity is detected. The system 360 may comprise, in addition, a transmission module 326 to send the identifier 338 to the second node (e.g., NODE_2) to enable the second node to obtain replacement of a temporary network address TMPADD allocated to the second node with one of the permanent network addresses 332.

The first node (e.g., NODE_1) may comprise a DS server. The device used to store the mapping lists 340 can be separated from the first node, and thus, the system 360 may further comprise the storage unit 354 housed in a third node (e.g., NODE_3). Still further embodiments may be realized.

In some embodiments, a system 360 comprises a first node that provides address allocation to a second (client) node, to replace a temporary address held by the second node with a permanent address associated with a particular user identity. Thus, a system 360 may comprise a first node (e.g., NODE_N) to receive a release request 344 from a second node (e.g., NODE_2) to release a temporary network address TMPADD allocated to the second node, wherein the second node is associated with a user identity. The first node may further operate to receive an allocation request 346 from the second node to allocate a permanent network address PERMADD previously assigned to the user identity, wherein the allocation request 346 includes an identifier 338 generated in association with the second node and the user identity. The system 360 may further include an allocation module 356 to allocate the permanent network address PERMADD to the second node as a replacement for the temporary network address TMPADD.

The system 360 may include a DHCP server to provide the services of the first node (e.g., NODE_N). Thus, the first node may comprise a DHCP server. The system 360 may include a DS as part of another node. Thus, the system 360 may comprise a third node (e.g., NODE_1) to couple to the first node and to provide a directory service to assign the permanent network address PERMADD to the user identity.

The nodes 302 may exist as a device embedded within another structure (e.g., as an embedded device), or as a desktop or laptop computer that includes a display 342 to show the activities conducted while the node 302 is active. Thus, the system 360 may also comprise a display 342 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
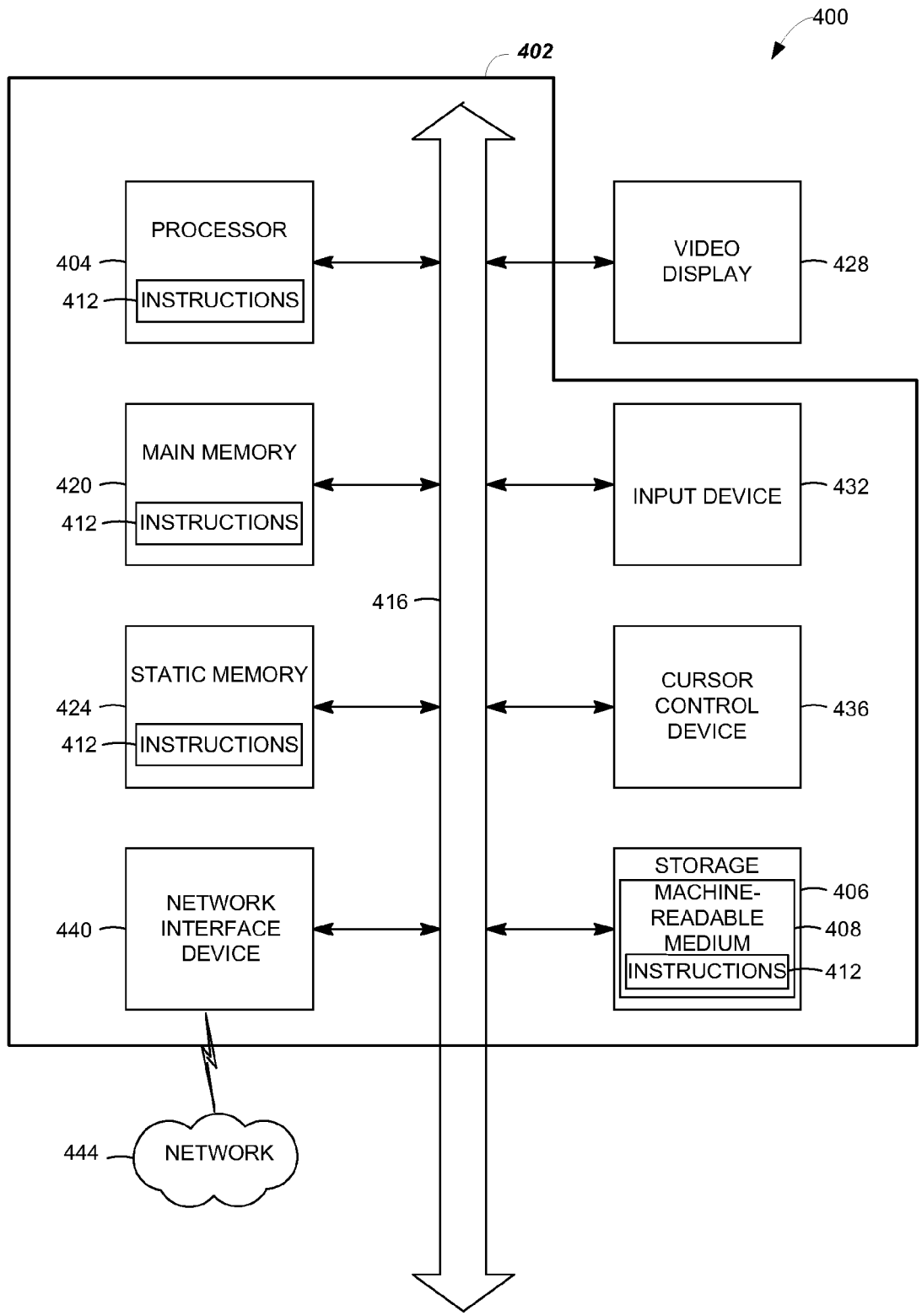
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a notebook computer, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to pre-allocate a set of IP addresses to users when user accounts are created by a DS. This assignment of permanent IP addresses to specific user identities can make it much easier for network administrators to monitor and control the activity of users within a network. Further, the mechanisms described herein can make it possible for individual users to receive the same IP address whenever they log in to a particular network, regardless of the device used to gain access. More efficient allocation of processing resources, and increased user satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
a first node to access a storage unit to store a plurality of mapping lists, at least one of the plurality of mapping lists including one or more permanent network addresses assigned to a user identity;
a generator module to generate, using at least one processor, an identifier associated with the user identity when access to a network by a second node associated with the user identity is detected; and
a transmission module to send the identifier to the second node to enable the second node to obtain replacement of a temporary network address allocated to the second node with at least one permanent network address of the one or more permanent network addresses, the transmission module to receive a release request from the second node to release the temporary network address allocated to the second node, to receive an allocation request from the second node to allocate the at least one permanent network address, the allocation request including the identifier, to allocate the at least one permanent network address to the second node as the replacement for the temporary network address, and to assign the at least one permanent network address to a third node based on a determination that a user associated with the user identity moves from the second node and logs on to the third node.

2. The system of claim 1, wherein the first node comprises a directory service server.

3. The system of claim 1, further comprising:
the storage unit housed in the first node or in another node.

4. The system of claim 3, wherein the other node comprises a Dynamic Host Configuration Protocol (DHCP) server.

5. The system of claim 1, wherein the one or more permanent network addresses are assigned to the user identity when a corresponding user account is created by the first node.

6. The system of claim 1, wherein the one or more permanent network addresses comprise a plurality of network addresses associated with a same subnet of the network.

7. The system of claim 1, wherein the one or more permanent network addresses comprise a first network address and a second network address, the first network address being associated with a first subnet of the network and the second network address being associated with a second subnet of the network.

8. The system of claim 1, wherein the identifier is generated as a result of authenticating the user identity.

9. The system of claim 1, wherein the identifier comprises a random identifier and a user name, the random identifier being different for each request for a permanent network address.

10. A processor-implemented method to execute on one or more processors that perform the method, comprising:
accessing a storage unit, by a first node, to store a plurality of mapping lists including one or more permanent network addresses;
assigning at least one permanent network address of the one or more permanent network addresses to a user identity;
detecting a second node accessing a network, the second node associated with the user identity;
generating an identifier associated with the user identity;
sending, via a transmission module, the identifier to the second node to enable the second node to obtain replacement of a temporary network address allocated to the second node with the at least one permanent network address;
receiving, via the transmission module, a release request from the second node to release the temporary network address allocated to the second node;
receiving an allocation request from the second node to allocate the at least one permanent network address, the allocation request including the identifier; and
allocating the at least one permanent network address to the second node as the replacement for the temporary network address, the at least one permanent network address to be assigned to a third node based on a determination that a user associated with the user identity moves from the second node and logs on to the third node.

11. The method of claim 10, wherein the detecting comprises:
authenticating the user identity.

12. The method of claim 11, wherein the authenticating comprises:
determining that log-in credentials received from the second node are associated with the user identity.

13. The method of claim 10, wherein the generating comprises:
generating the identifier as a random identifier.

14. The method of claim 10, further comprising:
receiving an address mapping request from an address management server, the request including the identifier.

15. The method of claim 10, further comprising:
sending an address mapping list including the at least one permanent network address to an address management server in response to receiving a request from the address management server, the request including the identifier.

16. The method of claim 10, wherein the sending comprises:
sending the address mapping list from a directory service.

17. The method of claim 10, wherein the node comprises one of a physical machine or a virtual machine.

18. The method of claim 10, wherein the identifier comprises a randomly-generated identifier generated by a directory service.

19. The method of claim 10, further comprising:
transmitting an address mapping request to a directory service, the request including the identifier.

20. The method of claim 10, further comprising:
receiving an address mapping list including the at least one permanent network address from a directory service.

21. The method of claim 20, wherein the address mapping list comprises:
multiple permanently-assigned network addresses associated with the user identity, including the at least one permanent network address.

* * * * *